(12) United States Patent
Karrupaiah et al.

(10) Patent No.: US 6,537,690 B1
(45) Date of Patent: Mar. 25, 2003

(54) METHOD OF OPERATING A FUEL CELL SYSTEM

(75) Inventors: Chockkalingam Karrupaiah, Troy, NY (US); James McElroy, Suffield, CT (US)

(73) Assignee: Plug Power Inc., Latham, NY (US)

( * ) Notice: Subject to any disclaimer, the term of this patent is extended or adjusted under 35 U.S.C. 154(b) by 247 days.

(21) Appl. No.: 09/694,461

(22) Filed: Oct. 23, 2000

(51) Int. Cl.[7] .......................... H01M 8/00; H01M 8/04; H01M 8/12
(52) U.S. Cl. ................. 429/13; 429/12; 429/23
(58) Field of Search ................. 429/12, 13, 17, 429/19, 22, 23, 30

(56) References Cited

U.S. PATENT DOCUMENTS

| | | | | |
|---|---|---|---|---|
| 4,396,687 A | * | 8/1983 | Kummer et al. | 429/19 |
| 4,407,902 A | * | 10/1983 | Kummer et al. | 429/15 |
| 4,959,135 A | * | 9/1990 | Zenner et al. | 204/233 |
| 5,441,819 A | * | 8/1995 | Voss et al. | 429/13 |
| 5,766,442 A | * | 6/1998 | Bridger et al. | 205/318 |
| 6,242,118 B1 | * | 6/2001 | Grasso et al. | 429/12 |
| 6,284,399 B1 | * | 9/2001 | Oko et al. | 429/13 |
| 6,299,996 B1 | * | 10/2001 | White et al. | 429/19 |
| 6,309,532 B1 | * | 10/2001 | Tran et al. | 204/267 |

* cited by examiner

Primary Examiner—Carol Chaney
Assistant Examiner—Donald V. Scaltrito
(74) Attorney, Agent, or Firm—Fish & Richardson P.C.

(57) ABSTRACT

Methods of operating a fuel cell system are disclosed. The methods can include flowing an anode gas through a fuel cell without flowing a cathode gas through the fuel cell while placing a voltage across the fuel cell.

31 Claims, 4 Drawing Sheets

METHOD OF OPERATING A FUEL CELL SYSTEM

TECHNICAL FIELD

The invention relates to methods of operating a fuel cell system.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water or other low conductivity fluids) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to methods of operating a fuel cell system.

In one aspect, the invention generally features a method of operating a fuel cell. The fuel cell has an anode flow field plate and a cathode flow field plate. The method includes placing a voltage across the fuel cell while flowing an anode gas through the anode flow field plate without flowing a cathode gas through the cathode flow field plate.

In another aspect, the invention generally relates to a method of operating a fuel cell stack that includes one or more fuel cells. The fuel cell stack has an anode gas manifold and a cathode gas manifold. The method includes placing a voltage across the fuel cell(s) in the fuel cell stack while flowing an anode gas through the anode gas manifold without flowing a cathode gas through the cathode gas manifold.

In a further aspect, the invention generally relates to a method of operating a fuel cell stack that includes at least one fuel cell. The fuel cell stack has an anode gas manifold and a cathode gas manifold. The method includes: flowing an anode gas through the anode gas manifold while flowing a cathode gas through the cathode gas manifold; stopping the flow of cathode gas through the cathode gas manifold while continuing to flow the anode gas through the anode gas manifold; and placing a voltage across the fuel cell(s) in the fuel cell stack while the cathode gas flow through the cathode gas manifold is stopped.

Embodiments of the invention can include one or more of the following aspects.

The method can remove contaminants located at the cathode catalyst in the fuel cell, chemically reduce at least one oxidized portion of the cathode catalyst in the fuel cell, and/or remove water from the cathode gas diffusion layer.

The method can further include, before placing the voltage across the fuel cell(s), flowing the anode gas through the anode flow field plate while flowing the cathode gas through the cathode flow field plate. Flowing the anode gas through the anode flow field plate while flowing the cathode gas through the cathode flow field plate can produce a fuel cell power output greater than zero.

The method can further include, before placing the voltage across the fuel cell(s), stopping the flow of cathode gas through the cathode flow field plate when the power output of the fuel cell reaches a predetermined level.

The method can further include, before placing the voltage across the fuel cell(s), stopping the flow of cathode gas through the cathode flow field plate after a predetermined period of time, such as a maintenance interval.

The voltage of the anode flow field plate can be more positive than a voltage of the cathode flow field plate.

Other features, aspects and advantages of the invention will be apparent from the description, the drawings and the claims.

DETAILED DESCRIPTION

Figure 1:
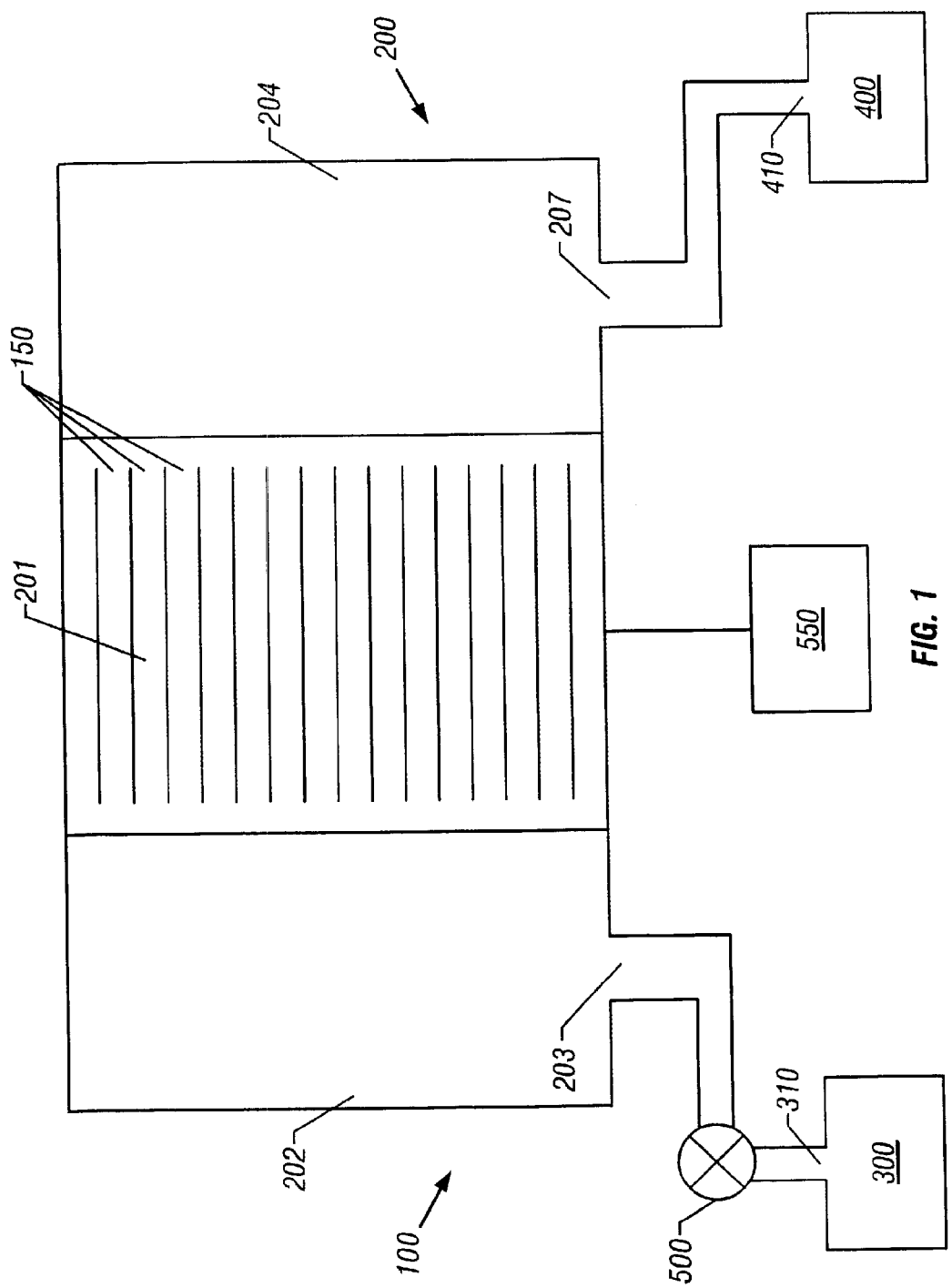
FIG. 1 is a schematic of an embodiment of a fuel cell system.

The invention relates to methods of operating a fuel cell system. FIG. 1 shows a fuel cell system 100 having two different operational states. System 100 includes a cathode gas supply 300, an anode gas supply 400, a valve 500, a power supply 550, and a fuel cell stack 200 having an active area 201 with PEM fuel cells 150 (see description of FIG. 3 below), a cathode gas input manifold 202 with an inlet 203 and an anode gas input manifold 204 with an inlet 207. System 100 can have outlets, or system 100 can be dead ended. Valve 500 is between cathode gas supply outlet 310 and inlet 203 of cathode gas input manifold 202 along a flow path so that gas supply 300 is in fluid communication with manifold 202 when valve 500 is open, and gas supply 300 is not in fluid communication with manifold 202 when valve 500 is closed. Anode gas supply 400 is in fluid communication with manifold 204 via outlet 410 and inlet 207.

In the first operational state, valve 500 is open, allowing cathode gas to flow from cathode gas supply 300 to manifold 202. At the same time, anode gas flows from anode gas supply 400 to manifold 204. The cathode gas in manifold 202 flows through the cathode flow field plates in fuel cells 150, and the anode gas in manifold 204 flows through the anode flow field plates in fuel cells 150. The anode and cathode gases in fuel cells 150 undergo a catalyzed reaction to produce water and power (e.g., electricity).

In the second operational state, valve 500 is closed, stopping the cathode gas from flowing from cathode gas supply 300 to manifold 202 and stopping the flow of cathode gas through the cathode flow field plates in fuel cells 150. Anode gas continues to flow from anode gas supply 400 to manifold 204 and through the anode flow field plates of fuel cells 150. Power supply 550 (e.g., a battery) places a voltage across one or more of fuel cells 150. Generally, power supply 550 places the anode side of fuel cell(s) 150 at a more positive voltage than the cathode side of fuel cells 150, commonly referred to as reverse polarity voltage.

Without wishing to be bound by any theories, it is believed that the second operational state of system 100 can be used to improve the performance of fuel cells 150 in a number of ways by allowing the formation of hydrogen on the cathode side of fuel cells 150 in the substantial absence of cathode gas (e.g., air or oxygen). Thus, rather than reacting with cathode gas to form water, the hydrogen formed on the cathode side of fuel cells 150 is allowed to undergo other reactions. For example, it is believed that either the molecular hydrogen formed on the cathode side of fuel cells 150 or intermediates present during the process of forming the hydrogen can chemically reduce oxidized portions of the cathode catalyst, thereby improving the ability of the cathode catalyst to catalyze the formation of water when system 100 is in the first operational state. It is also believed that either the molecular hydrogen formed on the cathode side of fuel cells 150 or intermediates present during the process of forming the hydrogen can remove contaminants present at the cathode catalyst (e.g., contaminants adsorbed to the surface of the cathode catalyst), thereby improving the ability of the cathode catalyst to catalyze the formation of water when system 100 is in the first operational state. It is further believed that the hydrogen formed on the cathode side of fuel cells 150 or intermediates present during the process of forming the hydrogen can remove water present at the cathode gas diffusion layer (e.g., by physically removing the water from the cathode gas diffusion layer), thereby improving the ability of the cathode gas diffusion layer to allow reactant gases (e.g., air and oxygen). By improving the ability of the cathode catalyst and/or the cathode gas diffusion layer to perform its function in fuel cells 150, the efficiency and/or performance (e.g., power output) of fuel cell system 100 can be improved.

In some embodiments, fuel cell system 100 is operated in the first operational state for a period of time, switched to the second operational state for a period of time, and then switched back to the first operational state. For example, fuel cell system 100 can be operated in the first operational state for a time period corresponding to a maintenance interval (e.g., from about one day to about three months, from about one day to about one month, from about one day to about two weeks, about one week). Fuel cell system 100 can then be switched to the second operational state. Generally, fuel cell system 100 is kept in the second operational state for a period of time sufficient to improve the performance (e.g., power output) of fuel cell system 100 when it is switched back to the first operational state. In some embodiments, fuel cell system 100 is kept in the second operational state for a time period of at least about 5 seconds (e.g., from about 5 seconds to about 24 hours, from about 5 seconds to about 12 hours, from about 5 seconds to about 2 hours, from about 5 seconds to about one hour, from about 5 seconds to about 30 minutes, from about 5 seconds to about 15 minutes, from about 5 seconds to about 5 minutes, from about 5 seconds to about one minute, about one minute). Fuel cell system 100 can then be switched back to the first operational state.

In certain embodiments, switching fuel cell system 100 from the first operational state, to the second operational state and back to the first operational state can improve the power output fuel cell system 100 by at least about 5 millivolts per fuel cell as measured at a current of 0.6 Amperes per square centimeter (e.g., at least about 10 millivolts per fuel cell as measured at a current of 0.6 Amperes per square centimeter, at least about 20 millivolts per fuel cell as measured at a current of 0.6 Amperes per square centimeter, at least about 30 millivolts per fuel cell as measured at a current of 0.6 Amperes per square centimeter).

The voltage across fuel cells 150 in the second operational state should be selected so that sufficient hydrogen is formed on the cathode side of fuel cells 150 so that fuel cell system 100 exhibits improved performance (e.g., power output) when system 100 is switched back to the first operational state. In some embodiments, the voltage is selected so that, based on the flow rate and throughput of anode gas through the anode flow field plates in fuel cells 150, about the maximum amount of hydrogen can be formed on the cathode side of fuel cells 150. In certain embodiments, the voltage is about 0.1 Volts per fuel cell. In these embodiments, the corresponding current can be about 0.6 Amperes per square centimeter.

Figure 2:
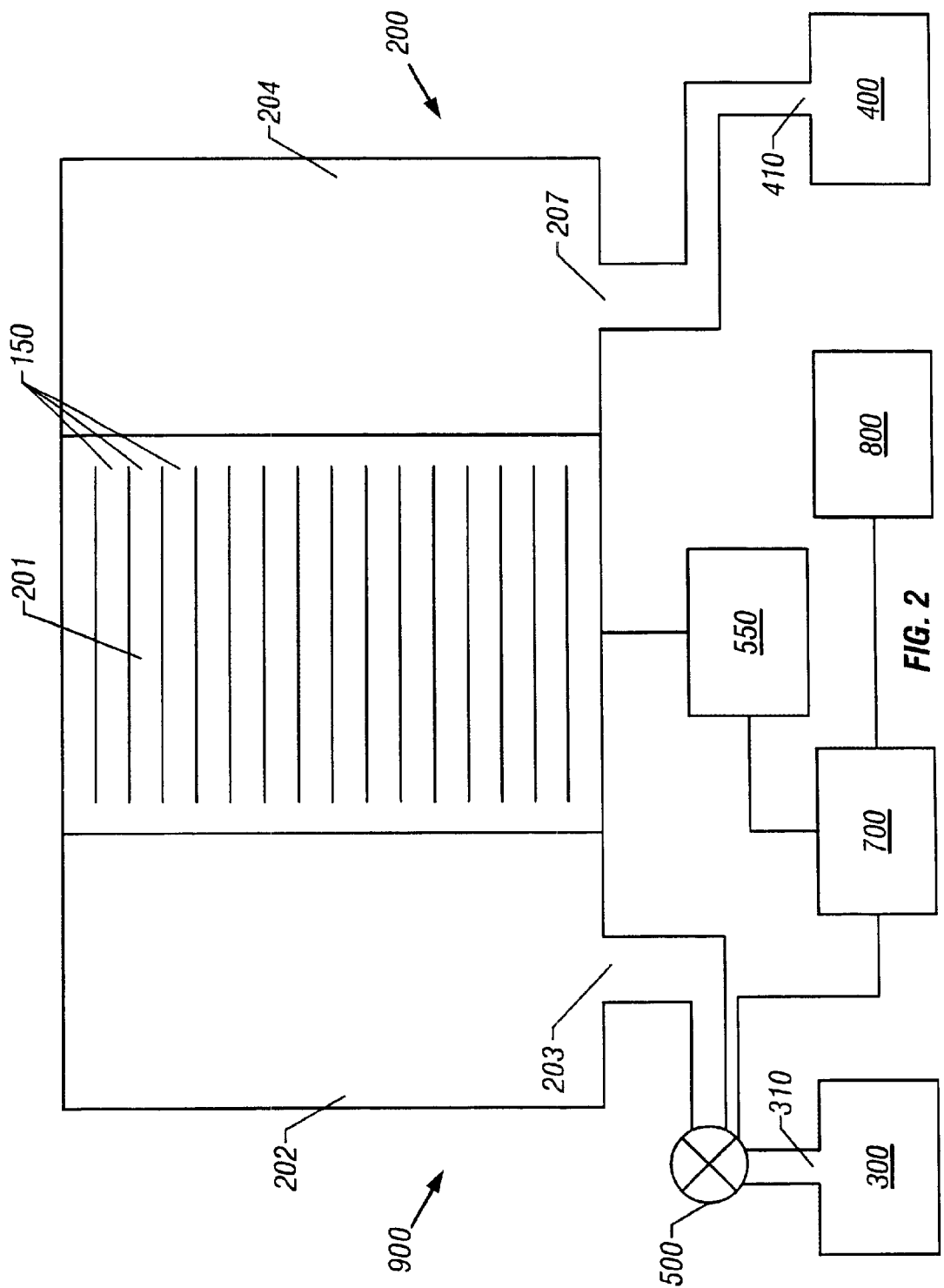
FIG. 2 is a schematic of an embodiment of a fuel cell system.

FIG. 2 shows a fuel cell system 900 that a controller 700 and a sensor 800. Controller 700 is in electrical communication with valve 500 and power supply 550 so that, depending upon the output signal from controller 700, valve 500 is open or shut and power supply 550 is on or off. System 900 can include outlets, or system 900 can be dead ended. Sensor 800 senses one or more parameters of interest relating to fuel cell system 100 (e.g., power output level of fuel cell system 900 and/or chemical make-up of constituents in the cathode and/or anode exhaust streams of fuel cell stack 200). Sensor 800 sends a signal to controller 700, and the output signal of controller 700 depends upon the signal controller 700 receives from sensor 800.

System 900 can be operated in the first operational state for a period of time until the parameter(s) measured by sensor 800 reaches some predetermined level, at which point the output signal received by controller 700 from sensor 800 causes controller 700 to shut valve 500 and turn on power supply 550, thereby placing fuel cell system 900 in the second operational state. System 900 is operated in the second operational state for a period of time, and then switched back to the first operational state.

In certain embodiments, system 900 can be designed so that there is a time lag between when controller 700 shuts valve 500 and when controller 700 turns on power supply 550.

In some embodiments, the operational state of system 900 can be changed manually with or without overriding controller 700 and/or sensor 800.

Figure 3:
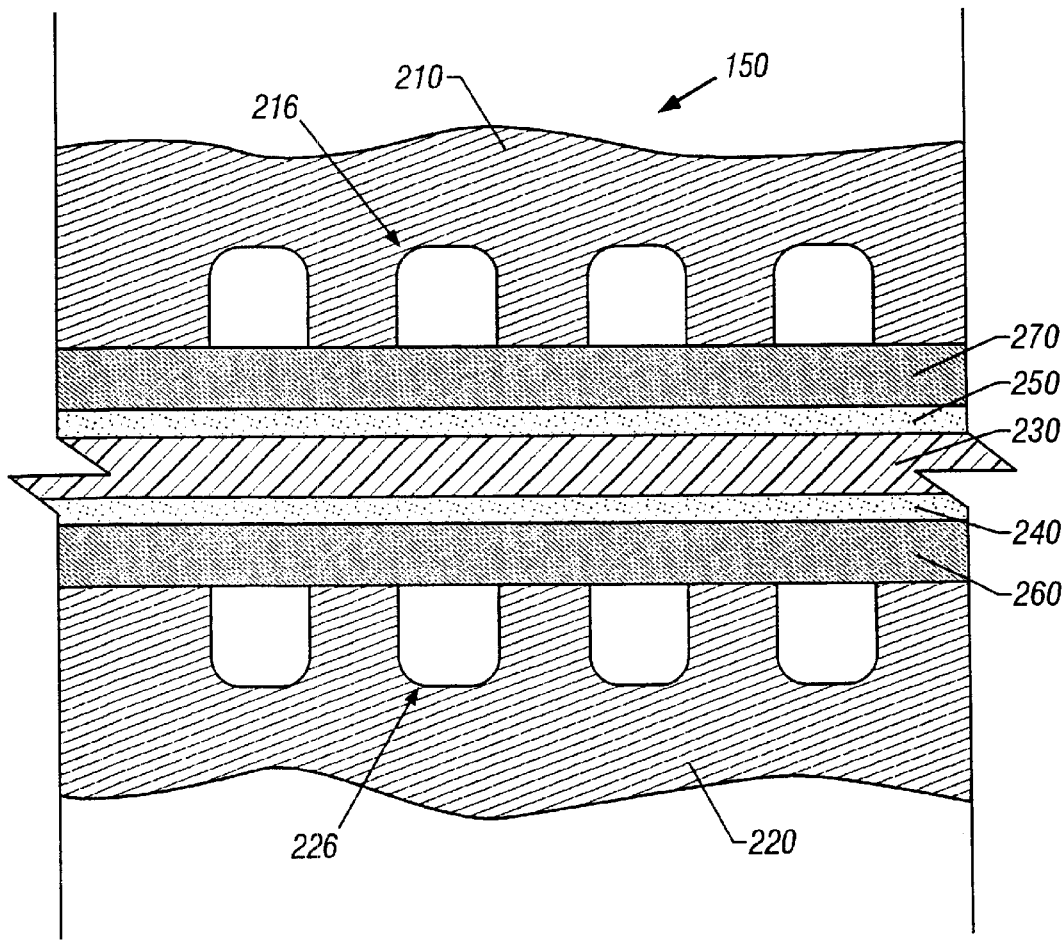
FIG. 3 is a cross-sectional view of an embodiment of a fuel cell.

FIG. 3 is a cross-sectional view of a PEM fuel cell 150 that includes a cathode flow field plate 210, an anode flow field plate 220, a PEM 230 (e.g., NAFION®), a cathode catalyst 250, an anode catalyst 240, a cathode gas diffusion layer 270, an anode gas diffusion layer 260. Cathode flow field plate 210 has channels 216, and anode flow field plate 220 has channels 226.

The following example is illustrative only and not intended as limiting.

The change in performance of a fuel cell system before and after operation in the second operational state was determined as follows.

The fuel cell system consisted of a single fuel cell. The current was of 0.6 Amperes per square centimeter. The anode gas formed of reformate flow with 4% air, and the cathode gas was air. The flow of anode gas was such that about 20% excess anode gas was available in the fuel cell. The flow of cathode gas was such that about 150% excess air was available in the fuel cell. The system was switched to the second operational state after about 2000 hours of operation in the first operational state.

The system was then run in the second operational state for one about minute while maintaining the same electric current and flow conditions for the anode gas (the cathode gas flow was stopped). After running in the second operational state for about one minute, the system was switched back to the first operational state and run at the same electric current and anode gas conditions. The cathode gas conditions were the same as used when the system was initially in the first operational state.

Figure 4:
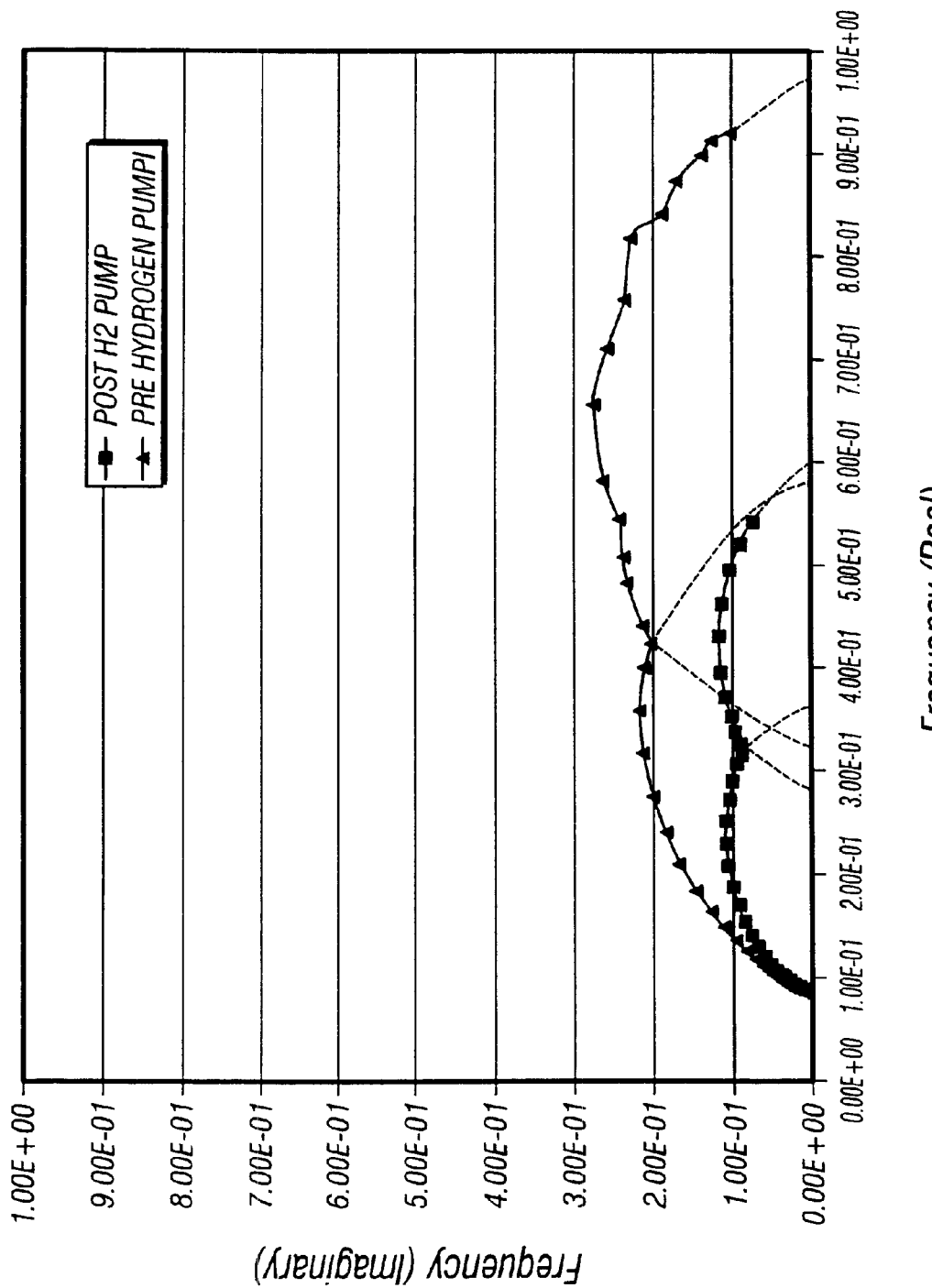
FIG. 4 is a spectrum of data corresponding to performance of a fuel cell system.

FIG. 4 shows the alternating current (A.C.) impedance of the fuel cell system in the first operational state before and after being switched to the second operational state. The A.C. impedance was determined using a Solarton 1250 impedance analyzer that generated an A.C. signal having an amplitude of 600 milliAmperes. The A.C. signal was imposed on the direct current (D.C.) output demanded by the fuel cell using a Hewlett Packard 6060A electronic load bank. The A.C. signal was fed through the External Programming Pins in the load bank. The A.C. signal produced a corresponding A.C. load and this is added on top of the D.C. load. The A.C. analyzer recorded the response from the fuel cell system as a function of frequency over a range of frequencies of the imposed A.C. signal. The response consisted of a real part and an imaginary part.

As shown in FIG. 4, each experiment resulted in a spectrum that consisted of two semicircle-like features. Without wishing to be bound by theory, the semicircle-like feature at relatively low frequency is believed to correspond to mass transport in the gas diffusion layers and/or flow field plates. The semicircle-like feature at relatively high frequency is believed to correspond to impedance due to charge transfer associated with the electrochemical reaction. The real axis intercept at relatively high frequency is believed to correspond to the impedance and/or conductivity of the PEM.

While certain embodiments have been described, the invention is not limited in this sense. Other embodiments are in the claims.

What is claimed is:

1. A method of operating a fuel cell having an anode flow field plate and a cathode flow field plate, the method comprising:

placing a voltage across the fuel cell while flowing an anode gas through the anode flow field plate without flowing a cathode gas through the cathode flow field plate.

2. The method of claim 1, wherein the method removes contaminants located at a cathode catalyst in the fuel cell.

3. The method of claim 1, wherein the method chemically reduces at least one oxidized portion of a cathode catalyst in the fuel cell.

4. The method of claim 1, wherein the method removes water from a cathode gas diffusion layer in the fuel cell.

5. The method of claim 1, further comprising, before placing the voltage across the fuel cell:

flowing the anode gas through the anode flow field plate while flowing the cathode gas through the cathode flow field plate.

6. The method of claim 5, wherein flowing the anode gas through the anode flow field plate while flowing the cathode gas through the cathode flow field plate produces a fuel cell power output greater than zero.

7. The method of claim 1, further comprising, before placing the voltage across the fuel cell, stopping the flow of cathode gas through the cathode flow field plate when a power output of the fuel cell reaches a predetermined level.

8. The method of claim 1, further comprising, before placing the voltage across the fuel cell, stopping the flow of cathode gas through the cathode flow field plate after a predetermined period of time.

9. The method of claim 8, wherein the predetermined period of time comprises from about one day to about three months.

10. The method of claim 1, wherein a voltage of the anode flow field plate is more positive than a voltage of the cathode flow field plate.

11. A method of operating a fuel cell stack including at least one fuel cell, the fuel cell stack having an anode gas manifold and a cathode gas manifold, the method comprising:

placing a voltage across the at least one fuel cell in the fuel cell stack while flowing an anode gas through the anode gas manifold without flowing a cathode gas through the cathode gas manifold.

12. The method of claim 11, wherein the method removes contaminants located at a cathode catalyst in the fuel at least one cell in the fuel cell stack.

13. The method of claim 11, wherein the method chemically reduces at least one oxidized portion of a cathode catalyst in the at least one fuel cell in the fuel cell stack.

14. The method of claim 11, wherein the method removes water from a cathode gas diffusion layer in the at least one fuel cell in the fuel cell stack.

15. The method of claim 11, further comprising, before placing the voltage across the at least one fuel cell in the fuel cell stack, flowing the anode gas through the anode gas manifold while flowing the cathode gas through the cathode gas manifold.

16. The method of claim 15, wherein flowing the anode gas through the anode gas manifold while flowing the cathode gas through the cathode gas manifold produces a first fuel cell stack power output greater than zero.

17. The method of claim 16, further comprising:

removing the voltage from the at least one fuel cell in the fuel cell stack; and flowing the anode gas through the anode gas manifold while flowing the cathode gas through the cathode gas manifold so that the fuel cell stack produces a second fuel cell stack power output greater than first fuel cell stack power output.

18. The method of claim 11, further comprising stopping the flow of cathode gas through the cathode gas manifold when a power output of the at least one fuel cell stack reaches a predetermined level.

19. The method of claim 11, further comprising, before placing the voltage across the at least one fuel cell in the fuel cell stack, stopping the flow of cathode gas through the cathode flow field plate after a predetermined period of time.

20. The method of claim 19, wherein the predetermined period of time comprises from about one day to about three months.

21. The method of claim 11, wherein a voltage of an anode flow field plate in the at least one fuel cell in the fuel cell stack is more positive than a voltage of an cathode flow field plate of the fuel cell in the at least one fuel cell stack.

22. A method of operating a fuel cell stack including at least one fuel cell, the fuel cell stack having an anode gas manifold and a cathode gas manifold, the method comprising:

flowing an anode gas through the anode gas manifold while flowing a cathode gas through the cathode gas manifold;

stopping the flow of cathode gas through the cathode gas manifold while continuing to flow the anode gas through the anode gas manifold; and placing a voltage across the at least one fuel cell in the fuel cell stack while the cathode gas flow through the cathode gas manifold is stopped.

23. The method of claim 22, wherein the method removes contaminants located at a cathode catalyst in the fuel cell in the at least one fuel cell stack.

24. The method of claim 22, wherein the method chemically reduces at least one oxidized portion of the cathode catalyst in a fuel cell in the fuel cell stack.

25. The method of claim 22, wherein the method removes water from a cathode gas diffusion layer in the at least one fuel cell in the fuel cell stack.

26. The method of claim 22, wherein flowing the anode gas through the anode gas manifold while flowing the cathode gas through the cathode gas manifold produces a first fuel cell stack power output greater than zero.

27. The method of claim 26, further comprising:

removing the voltage from the at least one fuel cell in the fuel cell stack; and flowing the anode gas through the anode gas manifold while flowing the cathode gas through the cathode gas manifold so that the fuel cell stack produces a second fuel cell stack power output greater than first fuel cell stack power output.

28. The method of claim 22, wherein the flow of the cathode gas through the cathode gas manifold is stopped when reaches a predetermined level.

29. The method of claim 22, wherein the flow of cathode gas through the cathode gas manifold is stopped after a predetermined period of time.

30. The method of claim 29, wherein the predetermined period of time comprises from about one day to about three months.

31. The method of claim 22, wherein a voltage of a cathode flow field plate in the at least one fuel cell in the fuel cell stack is more positive than a voltage of an anode flow field plate of the at least one fuel cell in the fuel cell stack.

* * * * *